Nov. 12, 1963     M. DE GROOTE ETAL     3,110,736
CERTAIN OXYALKYLATED POLYOLS
Filed Sept. 15, 1958
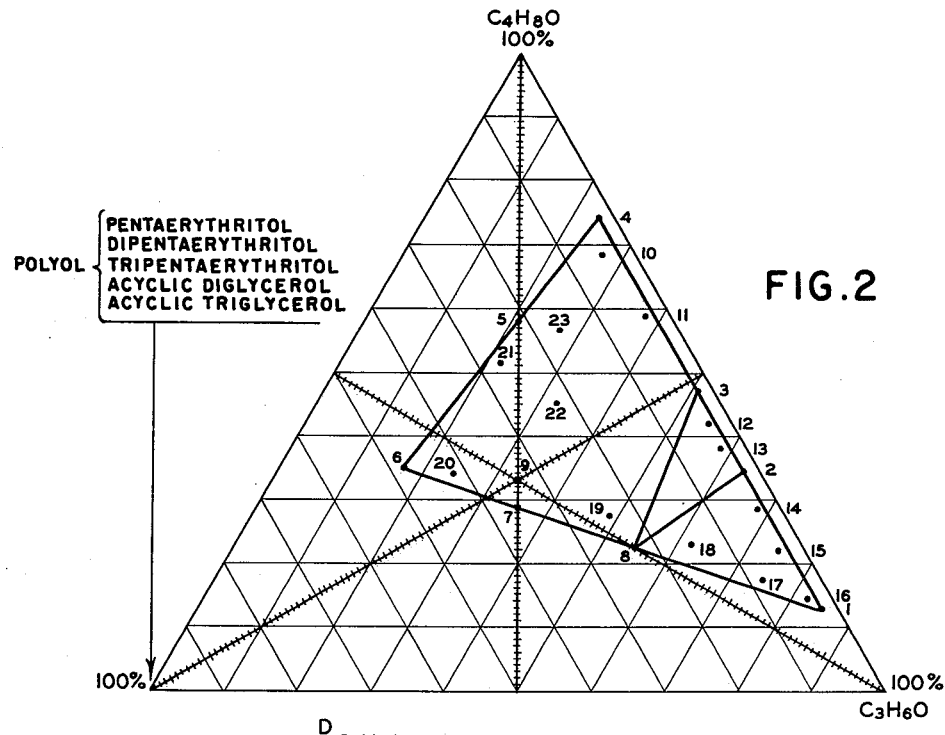
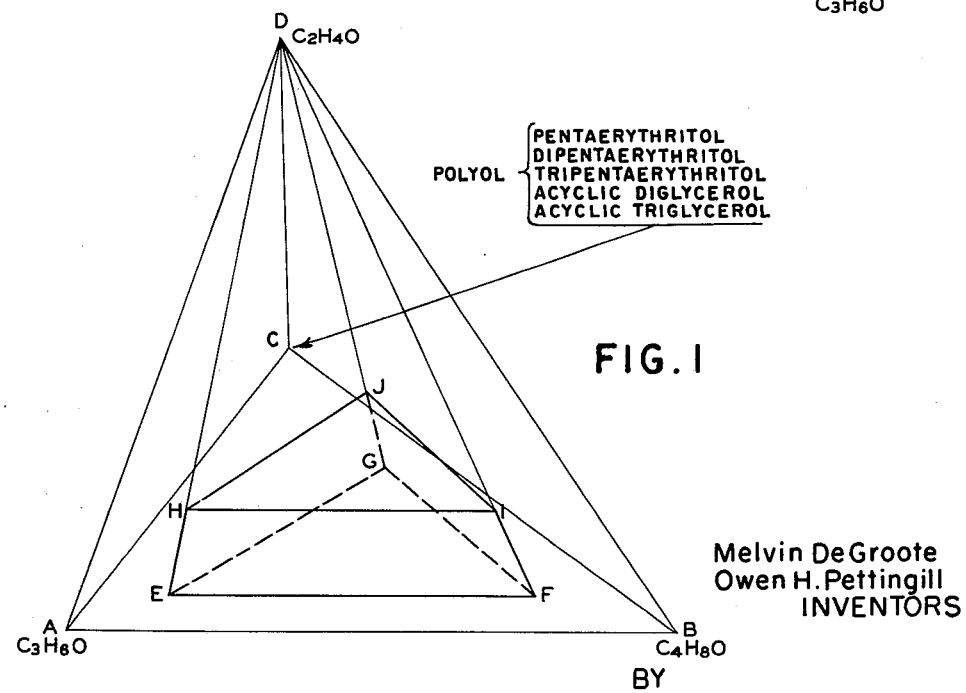
Melvin DeGroote
Owen H. Pettingill
INVENTORS
BY
Adams, Forward and McLean
ATTORNEYS

3,110,736
CERTAIN OXYALKYLATED POLYOLS
Melvin De Groote, St. Louis, and Owen H. Pettingill, Kirkwood, Mo., assignors to Petrolite Corporation, Wilmington, Del., a corporation of Delaware
Filed Sept. 15, 1958, Ser. No. 760,995
1 Claim. (Cl. 260—615)

This application is a continuation-in-part of our co-pending applications Serial Nos. 648,736 and 648,738, filed March 26, 1957, and Serial Nos. 653,442; 653,444; and 653,446, filed April 17, 1957 and all now abandoned. These five co-pending applications are divisions respectively of Serial Nos. 435,664 and 435,666, filed June 10, 1954 and now both abandoned, and Serial Nos. 431,784; 431,786; and 431,788 and now Patent No. 2,944,979, filed May 24, 1954, Serial Nos. 431,784; and 431,786 having now issued as U.S. Patents 2,819,217 and 2,819,219, respectively.

Our invention is concerned with new chemical products or compounds useful as demulsifying agents in processes or procedures particularly adapted for preventing, breaking or resolving emulsions of the water-in-oil type and particularly petroleum emulsions. Our invention is also concerned with the application of such chemical products or compounds in various other arts and industries as well as with methods of manufacturing the new chemical products or compounds which are of outstanding value in demulsification.

More specifically, the present invention is concerned with a cogeneric mixture of a homologous series of glycol ethers of a polyol selected from the class consisting of pentaerythritol, dipentaerythritol, tripentaerythritol, a cyclic diglycerol and acyclic triglycerol.

The new products herein described are derived exclusively from one of the above polyols, ethylene oxide, propylene oxide and butylene oxide, in such weight proportions so the average composition of said cogeneric mixture in terms of the initial reactants lies approximately within the truncated triangular pyramid identified as E, H, F, K, and G, J, in FIGURE 1; with the proviso that the percentage of ethylene oxide, by weight, is within the limits of 2% to 39.5% and the remaining three initial reactants recalculated to 100% basis lie approximately within the triangular area defined in FIGURE 2 by points 1, 4, 6. However, as will be pointed out subsequently the same ultimate compositions may be employed using any one of the three oxides last.

The products of the present invention are also useful for various purposes other than the resolution of petroleum emulsions of the water-in-oil type.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents as, for example, for cosmetics, spray oils, water-repellent textile finishes; as lubricants, etc.

For the purpose of resolving petroleum emulsions of the water-in-oil type, and also for that matter for numerous other purposes where surface-active materials are effective, and particularly for those uses specified elsewhere herein, we prefer to employ oxyalkylated derivatives, which are obtained by the use of monoepoxides, in such manner that the derivatives so obtained have sufficient hydrophile character to meet at least the test set forth in U.S. Patent No. 2,499,368, dated March 7, 1950, to De Groote and Keiser. In said patent such test for emulsification using a water-insoluble solvent, generally xylene, is described as an index of surface activity.

The above mentioned test, i.e., a conventional emulsification test simply means that the preferred product for demulsification is soluble in a solvent having hydrophobe properties or in an oxygenated water-insoluble solvent, or a mixture containing a fraction of such solvent with the proviso that when such solution in a hydrocarbon solvent is shaken with water the product may remain in the nonaqueous solvent or, for that matter, it may pass into the aqueous solvent. In other words, although it is xylene soluble, for example, it may also be water soluble to an equal or greater degree.

For purpose of convenience what is said hereinafter will be divided into five parts:

Part 1 is concerned with the oxyalkylation of the polyol in general;

Part 2 is concerned with binary or tertiary products derived from the polyol initially oxyalkylated with a single oxide, or initially oxyalkylated with two oxides, which may be looked upon as intermediate products. More conveniently, the binary compositions may be considered as subintermediates and the tertiary compositional products as intermediates, all of which will be plain in light of the subsequent specification. Such intermediates are reacted with one more component, for instance, ethylene oxide, to give the four-component product described preceding.

Part 3 is concerned essentially with oxyethylation of the intermediates described in Part 2, preceding. Needless to say, if the intermediate were obtained by the use of ethylene oxide and either butylene oxide or propylene oxide, then the final stage would involve introduction of the other oxide, i.e., propylene oxide or butylene oxide.

Part 4 is concerned with the resolution of petroleum emulsions of the water-in-oil type by means of the previously described chemical compounds;

Part 5 is concerned with uses for the products herein described, either as such or after modification, including applications other than those involving the resolution of petroleum emulsions of the water-in-oil type.

PART 1

The oxyalkylation of poyols such as pentaerythritol, dipentaerythritol, tripentaerythritol, a cyclic diglycerol and a cyclic triglycerol can be accomplished in a number of ways and the particular procedure is immaterial. One can employ an alkylene oxide or one can employ an alkylene carbonate such as ethylene carbonate, butylene carbonate, or propylene carbonate for the initial oxyalkylation.

In the use of butylene oxide the same procedure can be employed as in the oxypropylation of tripentaerythritol as described in U.S. Patents 2,626,907 and 2,626,908, both dated January 27, 1953, and both to De Groote. See also what appears in U.S. Patent 2,552,528 dated March 15, 1951, to De Groote. See also Examples 8a through 12a, inclusive, in U.S. Patent 2,626,906, dated January 27, 1953, to De Groote. In essence, we have found we can oxybutylate pentaerythritol in the same manner conventionally employed for oxypropylation, for example, we have found the directions which appear in columns 5, 6, 7, and 8 of aforementioned U.S. Patent 2,626,908, in regard to oxyethylation or oxypropylation of tripentaerythritol are just as suitable in regard to the oxybutylation of the above polyols. We have completed the reactions under the same conditions set forth in Examples 1a through 4a using butylene oxide and varied the procedure only in that the time required was somewhat slightly longer.

To illustrate such well known procedure the following examples are included.

*Example 1a*

The reaction vessel employed was a stainless steel autoclave with the usual devices for heating, heat control, stirrer, inlet, outlet, etc., which is conventional in this type of apparatus. The capacity was approximately 4 liters. The stirrer operated at a speed of approximately 250 r.p.m. There were charged into the autoclave 500 grams of pentaerythritol, 300 grams of xylene, and 15 grams of sodium methylate. The autoclave was sealed, swept with nitrogen gas and stirring started immediately and heat applied. The temperature was allowed to rise to approximately 145° C. At this particular time the addition of butylene oxide was started. The butylene oxide employed was a mixture of the straight chain isomer substantially free from isobutylene oxide (roughly 85% of the 1,2 isomer and approximately 15% of the 2,3-cis- and the 2,3-trans-isomer). It was added continuously at such speed that it was absorbed by the reaction as added. The amount added in this operation was 1500 grams. The time required to add the butylene oxide was two hours. During this period the temperature was maintained at 128° C. to 145° C., using cooling water through the inner coils when necessary and otherwise applying heat if required. The maximum pressure during the reaction was 48 pounds per square inch. Ignoring the xylene and sodium methylate and considering the pentaerythritol for convenience, the resultant product represents 3 parts by weight of butylene oxide to 1 part by weight of pentaerythritol.

*Example 2a*

The reaction mass was transferred to a larger autoclave (capacity about 15 liters). Without adding any more catalyst or xylene, the procedure was repeated so as to add another 1500 grams of butylene oxide under substantially the same operating conditions but requiring about 3 hours for the addition. At the end of this step the ratio represented aproximately 6 to 1 (ratio butylene oxide to pentaerythritol).

*Example 3*

In a third step, 1625 grams of butylene oxide were added in approximately 5.75 hours, using the same operating temperatures and pressures. The ratio at the end of the third step was 9.25 parts by weight of butylene oxide per part of pentaerythritol.

*Example 4a*

At the end of the third step the autoclave was opened and an additional 5 grams of sodium methylate added, the autoclave flushed out as before, and the fourth and final oxyalkylation completed using 1625 grams of butylene oxide, and the oxyalkylation was finished within 3 hours using the same temperature range and pressure as previously. At the end of the reaction the product represented approximately 12.5 parts of butylene oxide by weight to one part of pentaerythritol.

Additional runs were made with dipentaerythritol, tripentaerythritol, acyclic diglycerol and acyclic triglycerol employing the same reaction procedure, equipment, and reactant amounts as described in Examples 1a through 4a. The pertinent data with respect to reaction conditions appear below.

|  | Reaction Temperature, °C. | Maximum Pressure | Time Required to Add BuO | | | |
| --- | --- | --- | --- | --- | --- | --- |
|  |  |  | First Step | Second Step | Third Step | Fourth Step |
| Dipentaerythritol | 130-148 | 55 | 2 | 4 | 6.75 | 4.5 |
| Tripentaerythritol | 132-145 | 48 | 2 | 3.75 | 6 | 3.75 |
| Diglycerol | 135-150 | 50 | 2 | 3 | 6 | 3.25 |
| Triglycerol | 135-150 | 50 | 2 | 3 | 6 | 3.25 |

All the products of the examples, except those of the first step, were substantially water-insoluble and xylene-soluble.

PART 2

*Section A*

The present invention is concerned with a cogeneric mixture which is the end product of a reaction or reactions involving 4 reactants. Assuming completeness of reaction and based on a mathematical average, the final product is characterized most conveniently in terms of the 4 component reactants.

In representing a mixture or an end-product derived from 2 components or 3 components, there is no difficulty as far as using the plane surface of an ordinary printed sheet. For example, a 3-component system is usually represented by a triangle in which the apexes represent 100% of each component and any mixture or reaction product in terms of the 3 components is represented by a point in the triangular area in which the composition is indicated by perpendiculars from such point to the sides.

Chemists and physicists ordinarily characterize a 4-component system by using a solid, i.e., a regular tetrahedron. In this particular presentation each point or apex represents 100% of each of the 4 components, each of the 6 edges represent a line or binary mixture of the 3 components represented by the apexes or points at the end of the line or edge. Each of the 4 triangles or faces represent a tertiary mixture of the 3 components represented by the 3 corners or apexes and obviously signify the complete absence of the 4th component indicated by the corner or apex opposite the triangular face.

However, as soon as one moves to a point within the regular tetrahedron one has definitely characterized and specified a 4-component mixture in which the 4-components add up to 100%. Such a representation of a 4-component system is described in detail in U.S. Patent 2,549,438 to De Groote et al.

The invention will be described by reference to the accompanying drawings, which illustrate, in conventional graphical form, compositions used in accordance with the invention in terms of the four components. In the drawings, FIGURE 1 is a conventional tetrahedron in which a trapezoidal area is blocked out and which defines the scope of the invention. FIGURE 2 is a planar figure by which, having a fixed amount of one constituent, the other three may be determined.

Referring to FIGURE 1, the composition represented by the block, which is really a truncated triangular pyramid, is designated by E, H; F, I; and G, J. The base of the truncated pyramid, that is E, F, G, does not rest on the bottom of the equilateral base triangle, but is a base parallel to the equilateral triangle, two units up, i.e., representing 2% of ethylene oxide. Similarly, the upper base of the truncated pyramid H, I, J, lies in a plane which is 39.5 units up from the base, to wit, represents 39.5% ethylene oxide.

A simplification of the problem of characterizing a 4-component system is this: If the amount of one component is determined or if a range is set, for example, 2% to 39.5% of ethylene oxide, then the difference between this amount and 100%, i.e., 60.5% to 98%, represents the amounts of percentages of the other three components combined, and these three components recalculated to 100% bases can be determined by use of an ordinary triangular graph.

FIGURE 2 shows a triangle and the three components other than ethylene oxide. These three components added together are less than 100%, to wit, 60.5% to 98%, but for reasons explained are calculated back to 100%. It will be noted that FIGURE 2 shows a triangle 1,4 and 6, which represents the bases (top, bottom, or for that matter, intermediate) of the truncated pyramid of FIGURE 1.

PART 2

Section B

Hardly any directions are required to produce the compounds of FIGURE 2. However, referring to the proportions of the initial reactants based on FIGURE 2, it will be noted that we have calculated the percentage of the three initial reactants for points 1 to 23, inclusive, so as to yield the intermediate derived from the polyol, propylene oxide, and butylene oxide. These points determine not only the triangle but also numerous points within the triangle.

These data are included in Table I immediately following:

TABLE I

| Points on Boundary of area | Tertiary Mixture | | | Binary Intermediate Mixtures | | | |
|---|---|---|---|---|---|---|---|
| | Polyol | Propylene Oxide, Percent | Butylene Oxide, Percent | Polyol | Propylene Oxide, Percent | Polyol | Butylene Oxide, Percent |
| 1 | 1.0 | 86.5 | 12.5 | 1.14 | 98.86 | 7.42 | 92.58 |
| 2 | 1.0 | 63.0 | 36.0 | 1.56 | 98.44 | 2.70 | 97.3 |
| 3 | 1.0 | 50.0 | 49.0 | 1.96 | 98.04 | 2.0 | 98.0 |
| 4 | 1.0 | 24.0 | 75.0 | 4.0 | 96.0 | 1.32 | 96.68 |
| 5 | 21.0 | 21.0 | 58.0 | 50.0 | 50.0 | 26.55 | 73.45 |
| 6 | 45.8 | 17.0 | 34.5 | 74.5 | 25.5 | 58.4 | 41.6 |
| 7 | 36.0 | 36.0 | 28.0 | 50.0 | 50.0 | 56.3 | 43.7 |
| 8 | 22.5 | 55.0 | 22.5 | 29.0 | 71.0 | 50.0 | 50.0 |
| 9 | 33.0 | 33.0 | 34.0 | 50.0 | 50.0 | 49.2 | 50.8 |
| 10 | 4.0 | 27.5 | 68.5 | 12.7 | 87.3 | 5.52 | 94.48 |
| 11 | 3.5 | 38.5 | 58.5 | 8.45 | 91.55 | 5.68 | 94.32 |
| 12 | 2.5 | 55.0 | 42.5 | 4.35 | 95.65 | 5.56 | 94.44 |
| 13 | 2.5 | 59.0 | 48.5 | 4.06 | 95.94 | 4.9 | 95.1 |
| 14 | 3.0 | 68.5 | 28.5 | 4.18 | 95.82 | 9.52 | 90.48 |
| 15 | 3.0 | 75.0 | 22.0 | 3.86 | 96.15 | 12.0 | 88.0 |
| 16 | 2.5 | 83.0 | 14.5 | 2.92 | 97.08 | 14.7 | 85.3 |
| 17 | 7.5 | 17.5 | 75.0 | 30.0 | 70.0 | 9.1 | 90.9 |
| 18 | 14.0 | 22.5 | 63.4 | 38.3 | 61.7 | 18.05 | 81.95 |
| 19 | 24.0 | 48.5 | 27.5 | 33.1 | 66.9 | 46.6 | 53.4 |
| 20 | 41.5 | 25.5 | 33.0 | 61.8 | 38.2 | 55.7 | 44.3 |
| 21 | 27.5 | 51.5 | 21.0 | 34.8 | 65.2 | 56.5 | 43.4 |
| 22 | 21.5 | 45.5 | 33.0 | 32.0 | 68.0 | 39.4 | 60.6 |
| 23 | 17.0 | 27.0 | 56.0 | 38.5 | 61.4 | 23.3 | 76.6 |

Note the first column gives various points on the boundary of the triangle or within the triangle. Note the next three columns represent the tertiary mixture corresponding to the initial reactants, i.e., the intermediate. These values represent percentages, by weight, of polyol, butylene oxide and propylene oxide. Thus, it is apparent that one can select any particular point in FIGURE 2 and simply use the appropriate amount of oxide to obtain the selected intermediate. For instance, in regard to point 1, all that would be necessary would be to mix 86.5 pounds of propylene oxide with 12.5 pounds of butylene oxide and use the mixture to oxylalkylate one pound of polyol.

Note that the fifth and sixth columns represent binary mixtures; for instance, in regard to the various points on the triangle and within the triangle, we have calculated the initial mixture using the polyol and propylene oxide in the first place and using the polyol and the ethylene oxide in the second place, which could be employed for subsequent oxyalkylation to give the particular composition required.

Referring now to the tertiary mixture table, it is apparent that for point 1 the polyol and propylene oxide together represent 87.5% and butylene oxide 12.5%. Therefore, one could employ 87.5 pounds of the binary mixture (a sub-intermediate) and react it with 12½ pounds of butylene oxide to give the three-component product (the intermediate).

Referring now to columns 7 and 8, one could produce an oxybutylated polyol and then subject it to reaction with propylene oxide. Using this procedure in regard to point 1, the mixture is obtained with 7.42 pounds of polyol and 92.58 pounds of butylene oxide. This product can then be subjected to reaction with propylene oxide in the ratio of 13.5 pounds of the mixture and 86.5 pounds of propylene oxide.

For purpose of illustration, we have prepared examples three different ways corresponding to the compositions of the so-called intermediate in FIGURE 2 for each of pentaerythritol, dipentaerythritol, tripentaerythritol, acyclic diglycerol and acyclic triglycerol. In the first series, butylene oxide and ethylene oxide were mixed; this series is indicated as 1a, 2a, 3a, through and including 23a; in the second series, which represents our preferred procedure, butylene oxide was used first, followed by propylene oxide. This series has been indicated as 1b, 2b, 3b, through and including 23b. Finally, in the third series propylene oxide was used first, followed by butylene oxide and the series identified as 1c, 2c, 3c, through and including 23c.

TABLE II

| Composition Corresponding to following Point | Composition where Oxides are Mixed Prior to Oxylalkylation | Composition where Butylene Oxide used first followed by Propylene Oxide | Composition where Propylene Oxide used first followed by Butylene Oxide |
|---|---|---|---|
| 1 | 1a | 1b | 1c |
| 2 | 2a | 2b | 2c |
| 3 | 3a | 3b | 3c |
| 4 | 4a | 4b | 4c |
| 5 | 5a | 5b | 5c |
| 6 | 6a | 6b | 6c |
| 7 | 7a | 7b | 7c |
| 8 | 8a | 8b | 8c |
| 9 | 9a | 9b | 9c |
| 10 | 10a | 10b | 10c |
| 11 | 11a | 11b | 11c |
| 12 | 12a | 12b | 12c |
| 13 | 13a | 13b | 13c |
| 14 | 14a | 14b | 14c |
| 15 | 15a | 15b | 15c |
| 16 | 16a | 16b | 16c |
| 17 | 17a | 17b | 17c |
| 18 | 18a | 18b | 18c |
| 19 | 19a | 19b | 19c |
| 20 | 20a | 20b | 20c |
| 21 | 21a | 21b | 21c |
| 22 | 22a | 22b | 22c |
| 23 | 23a | 23b | 23c |

The products illustrated by the preceding examples are not, of course, the final products of the present invention. They represent intermediates and require treatment with ethylene oxide to yield the products of the invention.

PART 3

In Part 2 preceding there has been described the preparation of sub-intermediates and intermediates. As previously noted, these intermediates need only be subjected to conventional oxyethylation to produce the products described in the present invention. The amount of ethylene oxide employed represents 2% to 39.5% of the final product with the proviso that the remainder of the product is represented by the three remaining components within the proportion set forth in FIGURE 2.

In preparing examples we have done nothing more except use conventional oxyethylation using an alkaline catalyst such as powdered caustic soda or sodium methylate. We have operated at temperatures varying from 110° to 135° C. We have used oxyethylation pressures of 10 pounds per square inch up to 30 pounds per square inch, but usually not over 15 pounds per square inch. The time period has varied from 15 minutes when just a small amount of oxide was employed, up to as much as 4 to 6 hours when a larger amount of oxide was used.

Obviously the simplest of calculations is involved although we have given the data in tabular form for the reason that we have indicated that the product containing 2% of ethylene oxides carries the designation A; the one having 5% ethylene oxide carries the designation B; the one having 10% ethylene oxide is C; the one having 15% is D; the one having 20% is E; and the one having 25% is F. Similarly, designations G, H, I, J, K, and L are products containing 27.5% to 39.5% of ethylene oxide, respectively, as shown in Table III.

TABLE III
[Proportions by weight]

| Ex. No. | Ethylene Oxide | 3-Component Intermediate of Part 2, Preceding | Designation |
|---|---|---|---|
| 1 | 2 | 98 | |
| 2 | 3 | 97 | |
| 3 | 4 | 96 | |
| 4 | 5 | 95 | A |
| 5 | 6 | 94 | B |
| 6 | 7 | 93 | |
| 7 | 8 | 92 | |
| 8 | 9 | 91 | |
| 9 | 10 | 90 | C |
| 10 | 11 | 89 | |
| 11 | 12 | 88 | |
| 12 | 13 | 87 | |
| 13 | 14 | 86 | |
| 14 | 15 | 85 | D |
| 15 | 16 | 84 | |
| 16 | 17 | 83 | |
| 17 | 18 | 82 | |
| 18 | 19 | 81 | |
| 19 | 20 | 80 | E |
| 20 | 21 | 79 | |
| 21 | 22 | 78 | |
| 22 | 23 | 77 | |
| 23 | 24 | 76 | |
| 24 | 25 | 75 | F |
| 25 | 27.5 | 72.5 | G |
| 26 | 30.0 | 70 | H |
| 27 | 32.5 | 67.5 | I |
| 28 | 35.0 | 65 | J |
| 29 | 37.5 | 62.5 | K |
| 30 | 39.5 | 60.5 | L |

The products obtained by the above procedure usually show some color varying from a light amber to a pale straw. They can be bleached in the usual fashion, using bleaching clays, charcoal, or an organic bleach, such as peroxide or peracetic acid, or the like.

Such products also have present a small amount of alkaline catalyst which can be removed by conventional means, or they can be neutralized by adding an equivalent amount of acid, such as hydrochloric acid. For many purposes the slight amount of residual alkalinity is not objectionable.

In the hereto appended claim reference has been made to "glycol ethers" of polyols in order to emphasize the fact that the final products of reaction have more than two hydroxyl radicals. However, the products may be considered as hypothetically derived by reaction of the appropriate polyol with the glycols, such as ethylene glycol, butylene glycol, propylene glycol, or polyglycols. For this reason there seems to be a preference to use the terminology "glycol ethers" rather than "polyol ethers."

PART 4

As to the use of conventional demulsifying agents reference is made to U.S. Patent No. 2,626,929, dated January 27, 1953, to De Groote, and particularly to Part 3. Everything that appears therein applies with equal force and effect to the instant process, noting only that where reference is made to Example 13b in said text beginning in column 15 and ending in column 18, reference is to a compound of the kind previously described derived by reacting 2.5 parts of the appropriate polyol with 14.5 parts of butylene oxide, followed by reaction with 83.0 parts of propylene oxide to give an intermediate which is then reacted in a ratio of 83 parts of the three-component intermediate with 17 parts of ethylene oxide.

PART 5

The compounds derived in the manner previously described, may be used as such for breaking petroleum emulsions of the water-in-oil type. They also can be converted into derivatives of the kind subsequently described which also may be used for this same purpose. Such derivatives are useful for other purposes including the same purpose for which the herein described products are effective such as where detergents, common solvents, emulsifiers, and the like are used. They may be used as lubricants and as additives to fluids used in hydraulic brake systems; they may be used as emulsifying agents to emulsify or remove greases or dirt; they may be used in the manufacture of a variety of other materials such as soluble oils, insecticide sprays, etc.

These products may be combined with a variety of reactants as chemical intermediates, for instance, with various diepoxides or polyepoxides. They may be combined with a number of other monoepoxides, such as epichlorohydrin, styrene oxide, glycide and methylglycide. They may be reacted with alkyl glycidyl ether, glycidyl isopropylether and glycidyl phenyl ether.

Furthermore, such products may be reacted with alkylene imines, such as ethylene imine or propylene imine to produce cation-active materials.

The products may be combined with carboxy acids such as higher fatty acids, so as to change their characteristics or with polycarboxy acids, such as diglycolic, maleic acid, phthalic acid, succinic acid, and the like to give resins, soft polymers or fractional esters which are essentially monomeric. Such products and others herein described, may all be used for the resolution of petroleum emulsions of the water-in-oil type. The products without further reaction are particularly valuable as additives for lubricating oils which are derived from sources other than petroleum.

The herein described products and the derivatives thereof are particularly valuable in flooding processes for recovery of oil from subterranean oil-bearing strata when employed in the manner described in U.S. Patent No. 2,233,381, dated February 25, 1941, to De Groote and Keiser.

Having thus described our invention, what we claim as new and desire to obtain by Letter Patent is:

A cogeneric mixture of a homologous series of glycol ethers of pentaerythritol said cogeneric mixture being derived exclusively from pentaerythritol reacted successively with butylene oxide, propylene oxide and ethylene oxide under oxyalkylation conditions in such weight proportions so that the average composition of said cogeneric mixture, stated in terms of the initial reactants, is such that the percentage of ethylene oxide is within the limits of 2% to 39.5%, by weight, and the remaining three initial reactants, recalculated to 100% basis, lie approximately within the triangle defined in FIGURE 2 by points 1, 4 and 6.

References Cited in the file of this patent

UNITED STATES PATENTS

| | | |
|---|---|---|
| 2,174,761 | Schuette et al. | Oct. 3, 1939 |
| 2,552,528 | De Groote | May 15, 1951 |
| 2,552,529 | De Groote | May 15, 1951 |
| 2,674,619 | Lundsted | Apr. 6, 1954 |
| 2,677,700 | Jackson et al. | May 4, 1954 |
| 2,839,476 | De Groote et al. | June 17, 1958 |
| 2,839,477 | De Groote et al. | June 17, 1958 |